United States Patent [19]
Olsen

[11] 4,241,379
[45] Dec. 23, 1980

[54] GAS PRESSURIZED HIGH VOLTAGE SWITCHING INSTALLATION

[75] Inventor: Willi Olsen, Berlin, Fed. Rep. of Germany

[73] Assignee: Siemens Aktiengesellschaft, Munich, Fed. Rep. of Germany

[21] Appl. No.: 962,927

[22] Filed: Nov. 22, 1978

[30] Foreign Application Priority Data

Dec. 6, 1977 [DE] Fed. Rep. of Germany ....... 2754691

[51] Int. Cl.³ .............................................. H02B 1/04
[52] U.S. Cl. ................................ 361/335; 200/148 R; 361/341
[58] Field of Search ................ 361/332, 335, 341; 200/148 R, 148 B

[56] References Cited

U.S. PATENT DOCUMENTS

| | | | |
|---|---|---|---|
| 3,619,729 | 11/1971 | Boersma | 361/341 |
| 3,823,346 | 7/1974 | Olsen | 361/341 |
| 3,891,862 | 6/1975 | Clark | 361/335 |
| 4,007,346 | 2/1977 | Gaigg | 200/148 R |

FOREIGN PATENT DOCUMENTS 1113189  5/1968  United Kingdom ..................... 361/335

Primary Examiner—Gerald P. Tolin
Attorney, Agent, or Firm—Kenyon & Kenyon

[57] ABSTRACT

In pressurized, gas insulated, high voltage switching installations with single or polyphase metal encapsulation, a switchgear section comprises several adjacent pressure tanks having gas tight partitions for accommodating the high-voltage switchgear and other current carrying parts. The number of encapsulation tanks is minimized by arranging the switchgear and current carrying parts belonging to one bus bar of the section in a first pressure tank, the power circuit breakers, work grounding switches, current transformers and section related current carrying parts of the section are arranged in a second pressure tank and the equipment and current carrying parts required on the terminal side of each section are arranged in a third pressure tank.

6 Claims, 6 Drawing Figures

GAS PRESSURIZED HIGH VOLTAGE SWITCHING INSTALLATION

BACKGROUND OF THE INVENTION

1. Field of the Invention

This invention relates to a pressurized, gas insulated, high voltage switching installation having single or polyphase metal encapsulation in which the switchgear sections comprise several adjacent pressure tanks, partitioned off in a gastight manner, for accommodating high voltage switchgear and other current carrying parts.

2. Description of the Prior Art

Siemens-Zeitschrift 1966, no. 4, at pages 263 to 266, describes a high voltage switching installation in which single phase branches are separately encapsulated and three-phase bus bars are encapsulated together. Siemens Zeitschrift 1975, no. 11, at pages 723 to 732, describes a high voltage switching installation of this type with full, three-phase encapsulation.

In the prior art installations, the operating switchgear and current carrying parts are, as a rule, individually accommodated in a multiplicity of differently shaped tanks which are partitioned off and gastight and are, essentially, connected in series, following the line of the current path between the bus bar and the line or cable termination.

This results in a correspondingly large number of flange connections which must be gastight. Also, due to the design, expensive storage provisions must be made for the different tanks. In addition, difficulties are encountered in realizing different circuit diagrams for each section when this is required, since the possibilities of varying the arrangements of tanks or encapsulation sections are very limited. The possibility of making such variations is particularly limited in polyphase installations because the conductor arrangement precludes, for instance, arbitrary rotation of the equipment.

In contrast to the above mentioned installations, German Patent 952 019 shows the arrangement of all the switchgear and current carrying parts of a section in a single tank. This design, however, has the disadvantage that, in the event of trouble or of maintenance and inspection work in one section, the entire installation must be shut down. If an insulating means having a dielectric strength greater than that of air at atmospheric pressure is used, it is necessary to drain off the insulating medium, with the consequence that, unless the installation is shut down, there is danger of breakdowns occurring because of the small insulating spaces.

The catalog of the firm COQ, Utrecht, "Trisep Metal-Clad SF$_6$-Insulated Switchgear 110 kV to 245 kV", shows a three phase, high voltage switching installation in which a portion of the disconnect switches belonging to the bus bar is arranged in the bus bar tank and the other part is accommodated in the power circuit breaker tank. This structure has the disadvantage that, in the event of an arcing fault occurring in the power circuit breaker tank which leads, for instance, to a welding together of the disconnect switch contacts, the power circuit breaker and the equipment enclosed by the tank can be repaired only if the associated bus bar, i.e., an essential part of the installation, is taken out of operation. Since the bus bar must remain shut down at least for the duration of the repair of the disconnect switch, operational availability is reduced. This is particularly disadvantageous in installations with only one bus bar system.

In the prior art installation, the power circuit breaker is accommodated in a separate pressure tank which is partitioned off from the tank for current transformers, work grounding switches and equipment required on the terminal side by means of a disconnect switch which, like the bus bar disconnect switches, has a switching gap in the power circuit breaker housing and another, electrically series connected, disconnecting gap located in the tank for the current transformer, the work grounding switches and the equipment required on the terminal side. The operability of the disconnect switches is therefore always dependent on the state of two different gas spaces.

It is an object of the invention to provide a high voltage switching installation of the type mentioned above in which maximum operating availability is ensured with a minimum number of tanks or encapsulation section forms.

SUMMARY OF THE INVENTION

According to the present invention, the above problem is solved by placing all switchgear and current carrying parts belonging to one bus bar of each section in a first pressure tank; by placing the power circuit breakers, work grounding switches and current transformers of each section, as well as section related parts for linking these equipments to each other and to equipments of adjoining pressure tanks of the same section, in a second pressure tank; and by placing all required equipments and current carrying parts of each section on the terminal side, such as disconnect switches, cable and overhead line terminating elements, and, if applicable, further grounding switches in a third pressure tank.

By applying the teachings of the invention, it is possible, with three basic tank structures, to construct an installation in which disturbances in one branch, for instance, in the second or third tank, have an effect on the bus bar only for a short time, i.e., until the bus bar disconnect switch in the first tank is opened.

Production, particularly in the area of tank fabrication, is substantially simplified by the invention. Assembly and testing work can be performed predominantly on subassemblies which are complete when placed in the tank. The invention makes it possible to assemble different equipment, arrangements and circuits related to specific sections in a particularly simple manner and with a small number of tank types, since only the arrangement of the conductors and the equipment within one and the same tank type need to be changed. Difficulties of lining up different tanks in different space configurations due to different circuit diagrams are thus avoided. It is a further substantial advantage of the invention that the number of partitioned-off spaces and thereby, the number of sealing points per section are kept small, so that the danger of gas losses and the reduction of the dielectric strength resulting therefrom is largely eliminated.

According to a further embodiment of the invention, the third pressure tank can be omitted in a high voltage switching installation where a coupling section for connecting two bus bars is used.

Still another advantage of the invention is that, if a high voltage switching installation is to be equipped with encapsulated, pressurized gas insulated voltage transformers, the latter can be coupled to each of the pressure tanks via prepared terminals. In a particularly advantageous embodiment of the high voltage switching structure according to the invention, the second pressure tank has a tubular shape and is arranged with the axis of the tube horizontal so that it supports the first and the third pressure tank.

BRIEF DESCRIPTION OF THE DRAWINGS

Embodiments of high voltage switching installations constructed in accordance with the teachings of the invention will be described below with reference to the drawings in which.

DETAILED DESCRIPTION OF THE INVENTION

Figure 1:
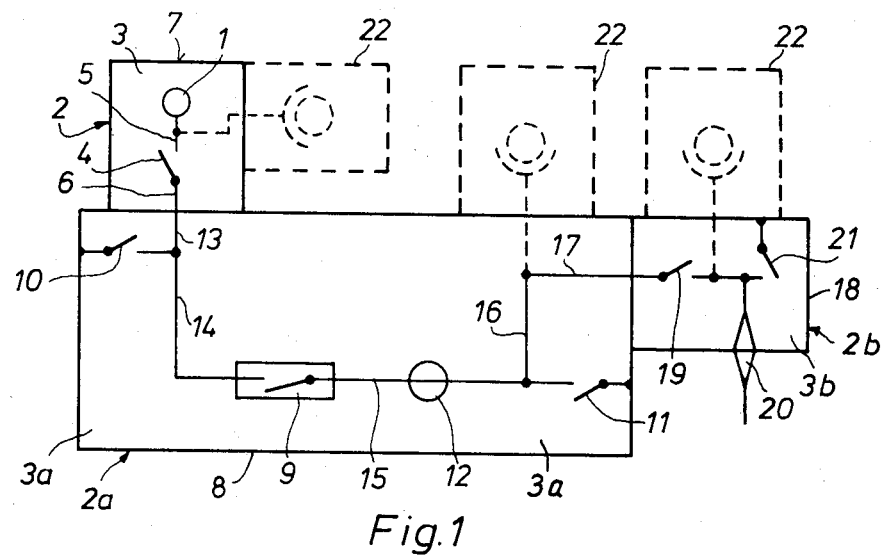
FIG. 1 is a schematic diagram of a switchgear section in a high voltage switching installation.

In FIG. 1, a switchgear section, (bay or feeder), of a high voltage switching installation is shown diagrammatically. This switchgear section is connected, together with other switchgear sections (not shown), to bus bar 1. The bus bar 1 which may be single phase or polyphase encapsulated, is provided with a metal encapsulation 2. The interior 3 of the encapsulation 2 is filled with sulfur hexafluoride under a pressure of 4 atmospheres, for instance, and forms the pressurized-gas insulation. The conductors of the bus bar system are supported within the encapsulation 2 by support insulators, not specifically shown. The bus bar 1 and the associated switchgear, i.e., the bus bar disconnect switch 4 and the current-carrying parts 5, 6 are arranged in a first pressure tank 7 which is formed by the encapsulation 2. This pressure tank 7 is attached to a second pressure tank 8 in a form-fitting manner. Pressure tank 8 contains the power circuit breaker 9, work grounding switches 10, 11, and the current transformer 12, as well as current-carrying parts 13, 14, 15, 16, 17 specific to the section. The second pressure tank 8 is formed by an encapsulation 2a, the interior 3a of which is likewise filled with sulfur hexafluoride at a pressure of, for instance, 6 bar. The second pressure tank 8 contains the equipments and current carrying parts for one or more phases of a three phase system.

A third pressure tank 18 is also connected to the pressure tank 8 in a form-fitting manner and contains all equipment and current carrying parts required on the terminal side. In the embodiment shown in FIG. 1, the pressure tank 18 contains a cable disconnect switch 19, a cable termination 20 and a fast action grounding switch 21. The pressure tank 18 is formed by the encapsulation 2b which contains sulfur hexafluoride 3b at a pressure of, for instance, 4 atmospheres, which serves as the pressurized gas insulation. As will be understood by those skilled in the art, the interior spaces 3, 3a and 3b are partitioned off in a gastight manner at the junctions of the tanks 7, 8, 9.

If required, gas pressurized, encapsulated voltage transformers 22 can be connected to the switching installation shown in FIG. 1, as shown by dashed lines. For this purpose, the voltage transformers 22 can be coupled to each of the pressure tanks 7, 8 and 18 via prepared terminal points. The pressurized gas insulation of the voltage transformers may be independent, or may be supplied as to gas flow by connection to the insulation of the terminal tank.

The second pressure tank 8 is of tubular shape and is arranged, with its tube axis horizontal, in such a way that it supports the first pressure tank 7 and the third pressure tank 18.

Figure 2:
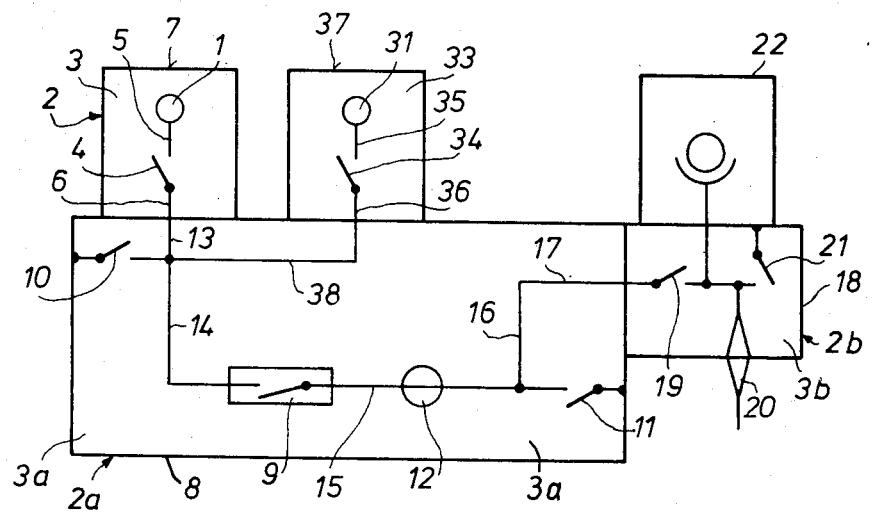
FIG. 2 is a schematic diagram of a switchgear section like that of FIG. 1, but for a dual bus bar system.

FIG. 2 shows a switchgear section of a high voltage switching installation useful in single or polyphase design for a dual bus bar system; i.e., in this embodiment example an additional bus bar 31 is provided which is arranged, via a separate bus bar disconnect switch 34, in the interior 33 of a pressure tank 37 which is connected to the pressure tank 8 in a form-fitting manner. The remaining parts, being like those in FIG. 1, are provided with the same reference symbols. For connecting the second bus bar system 31, an additional current carrying line 38 is provided in the tank 8. The interior 33 of tank 8 is partitioned off gastight from the adjacent space 3a and also contains current carrying parts 35, 36.

Figure 3:
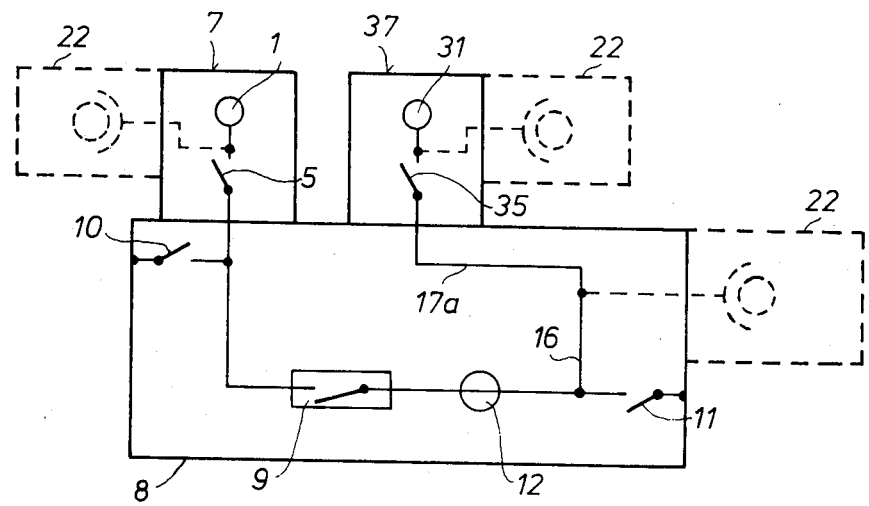
FIG. 3 is a schematic diagram of a switchgear section for connecting two bus bars.

The embodiment shown in FIG. 3 is a switchgear section used as a coupling section for connecting two bus bars 1, 31. Disregarding for the time being the possibility of employing encapsulated gas pressure insulated voltage transformers 22, shown by dashed lines, the third tank 18 of the previous embodiments has been omitted in this switchgear section. Only two types of encapsulation pressure tanks 7 and 37 are pressure tank 8, are provided. Otherwise, like parts are again provided with the same reference symbols. Although the outlines and therefore, the space required, are unchanged, different internal conductor configurations can be obtained in the above illustrative examples. Thus, conductor 17a in FIG. 3 is shown as reversing direction and going out of the tank top instead of out of the end (the way conductor 17 does in FIG. 2).

Figure 4:
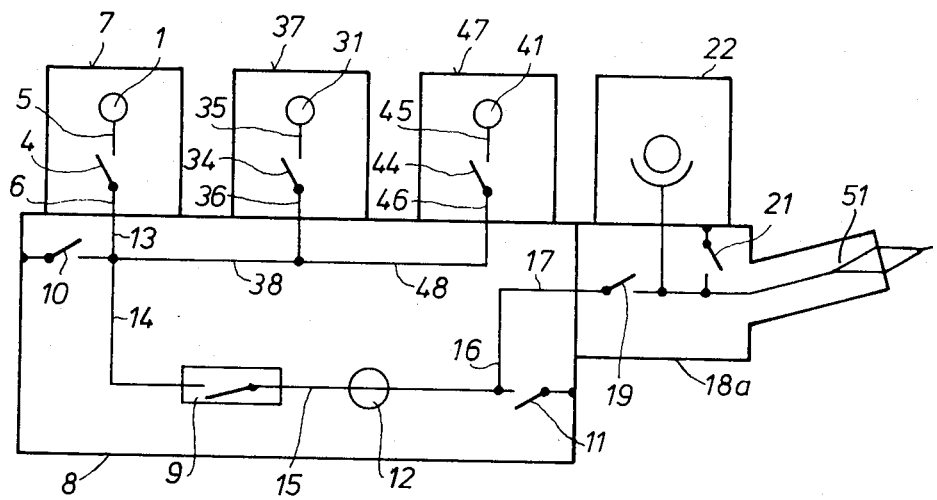
FIG. 4 is a schematic diagram of a switchgear section for use with an overhead line and a triple bus bar system.

In a further embodiment, a switchgear section is shown in FIG. 4, which is intended for use with an overhead line and is connected to a triple bus bar system. There, the tank 8 supports like tanks 7, 37 and 47 of the bus bar systems 1, 31 and 41, respectively, which are equipped with bus bar disconnect switches 4, 34, 44 and include the current carrying parts 5, 6; 35, 36; and 45, 46. A pressure tank 18a with an overhead line feedthrough 51 is connected to the tank 8; tank 8, in turn, contains the power circuit breaker 9 as well as work grounding switches 10, 11, current transformer 12 and the current-carrying parts 13, 14, 15, 16, and 17 as well as 38 and 48. In the tank 18a, an overhead line circuit breaker 19 and a fast action grounding switch 21 are provided. A voltage transformer 22 is associated with the pressure tank 18a on the line side.

Figure 5:
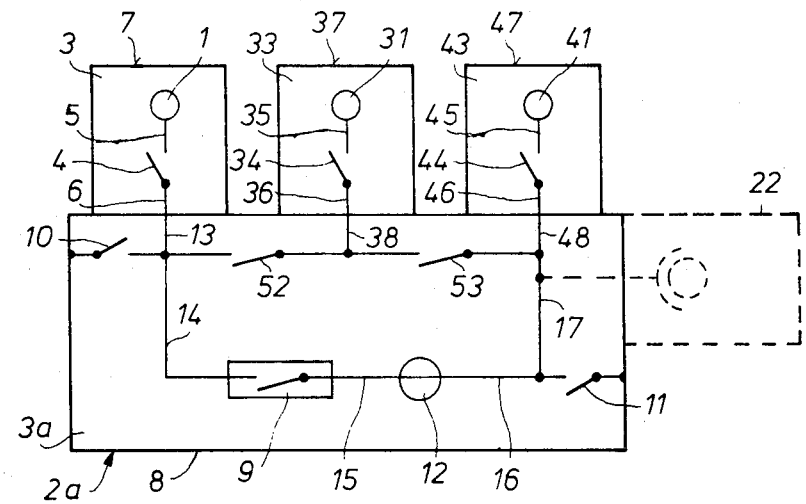
FIG. 5 is a schematic diagram of a coupling switchgear section for a triple bus bar using only two tank types.

FIG. 5 shows a coupling switchgear section for a triple bus bar in which only two types of tank, one type for encapsulation 8 and another for encapsulation 7, 37, and 47, are used in an arrangement similar to that of FIG. 3, if the possibility of connecting a voltage transformer 22 is disregarded. Here, too, like parts are provided with the same reference symbols. The bus bars 1, 31, and 41 can be coupled via disconnect switches 52, 53 as circuit elements specific to the section.

Figure 6:
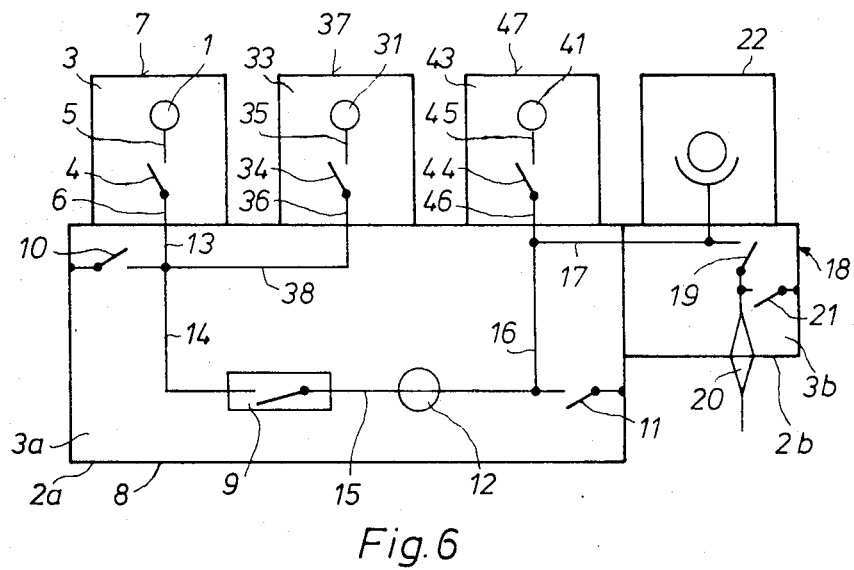
FIG. 6 is a schematic diagram of a switchgear section for a dual bus bar installation with bypass bus bars.

FIG. 6, lastly, shows a switchgear section for a dual bus bar section with bypass bus bars in which the voltage transformer 22 is arranged on the power circuit breaker side. Here, too, like parts are provided with the same reference symbols.

In all the examples illustrated above, it will be seen that all switchgear 4, 34, 44 and current carrying parts 5, 35, 45 and 6, 36, 46 belonging to a bus bar 1, 31, 41 are accommodated in first pressure tanks 7, 37, 47. The power circuit breaker 9, the work grounding switches 10, 11 and the current transformers of each section as well as the current carrying parts 13, 14, 15, 16, 17, 38 and 48 specific to the section as well as disconnect switches 52, 53 as interlinking current paths, if required, are arranged in a second pressure tank 8, and all equipments 19, 21, 20 and 51 required on the terminal side are arranged in a third pressure tank 18 or 18a, respectively. Thus it is possible to make a variety of equipment configurations using substantially only three different tank types by means of sub-assemblies which can be put in place through an end face of the tubular tank 8. For this purpose the end face of tank 8 contains an installation opening which can be closed by a cover.

In the case of single phase encapsulation of the equipments, the invention is particularly suitable for the phase-related installation, well known in the art, of a switching plant where all phases R, S, T are each arranged in a row, the three rows being parallel.

In the case where three-phase encapsulation of the equipment and current carrying parts is possible, a simplified structure results.

What is claimed is:

1. In a metal encapsulated, pressurized gas insulated installation for switching at least one high voltage phase and having at least one switchgear section comprising plural adjacent, gas-tight partitioned, pressure tanks accommodating the high-voltage switchgear and other current carrying parts, a current-carrying part of each pressure tank being electrically connected to at least one current-carrying part of an adjacent pressure tank, the improvement comprising:

a first pressure tank containing a switch for a bus bar of the section, at least one bus bar, and conductors connecting the switch to the bus bar and for connection to a current-carrying part of an adjacent tank;

a second pressure tank containing at least one power circuit breaker, at least one current transformer, at least one grounding switch, and conductors connecting the circuit breaker, the current transformer, and the grounding switch to each other and to a current-carrying part of at least one other pressure tank of the same section, the second pressure tank being elongate and horizontally disposed under the first pressure tank and the power circuit breaker being horizontally disposed therein, with the current transformer and the ground switch positioned on the extended line of the horizontal axis of the power circuit breaker; and a third pressure tank containing at least one component for the terminal side of the section, the component comprising at least one of a disconnect switch, a cable switch, an overhead line terminating element, and a grounding switch, as well as at least one conductor connecting such component to a current-carrying part of the second tank.

2. In a section of a high voltage switching installation in accordance with claim 1, the further improvement comprising terminals on at least one pressure tank for connectably receiving an encapsulated, pressurized gas insulated voltage transformer.

3. A high voltage switching installation according to one of claim 1 or claim 2, in which the second pressure tank is pipe-shaped and is mounted horizontally to support one or more pressure tanks of the first or third kind.

4. In a metal encapsulated, pressurized gas insulated installation for switching at least one high voltage phase and having at least one switchgear section comprising plural adjacent, gas-tight partitioned, pressure tanks accommodating the high-voltage switchgear and other current carrying parts, a current-carrying part of each pressure tank being electrically connected to at least one current-carrying part of an adjacent pressure tank, the improvement comprising:

a first pressure tank containing a switch for a bus bar of the section, at least one bus bar, and conductors connecting the switch to the bus bar and to a current-carrying part of an adjacent tank; and a second pressure tank containing at least one power circuit breaker, at least one current transformer, at least one grounding switch, and conductors connecting the circuit breaker, the current transformer, and the grounding switch to each other and to a current-carrying part of at least one other pressure tank of the same section, the second pressure tank being elongate and horizontally disposed under the first pressure tank and the power circuit breaker being horizontally disposed therein, with the current transformer and the ground switch positioned on the extended line of the horizontal axis of the power circuit breaker.

5. In a section of a high voltage switching installation in accordance with claim 4, the further improvement comprising terminals on at least one pressure tank for connectably receiving an encapsulated, pressurized gas insulated voltage transformer.

6. A high voltage switching installation according to one of claim 4 or claim 5, in which the second pressure tank is pipe-shaped and is mounted horizontally to support one or more pressure tanks of the first kind.

* * * * *